United States Patent
Ayoughi et al.

(10) Patent No.: US 9,998,190 B2
(45) Date of Patent: Jun. 12, 2018

(54) SYSTEM AND METHOD FOR JOINT MIMO TRANSMISSION AND COMPRESSION FOR INTERFERENCE MITIGATION WITH COOPERATIVE RELAY

(71) Applicants: Huawei Technologies Co., Ltd., Shenzhen (CN); The Governing Council of the University of Toronto, Toronto (CA)

(72) Inventors: Seyed Arvin Ayoughi, Toronto (CA); Wei Yu, Toronto (CA); Mohammadhadi Baligh, Ottawa (CA)

(73) Assignees: HUAWEI TECHNOLOGIES CO., LTD., Shenzhen (CN); THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 170 days.

(21) Appl. No.: 14/869,443

(22) Filed: Sep. 29, 2015

(65) Prior Publication Data
US 2016/0094285 A1 Mar. 31, 2016

Related U.S. Application Data

(60) Provisional application No. 62/057,122, filed on Sep. 29, 2014.

(51) Int. Cl.
*H04B 7/06* (2006.01)
*H04B 7/026* (2017.01)
(Continued)

(52) U.S. Cl.
CPC .......... *H04B 7/0617* (2013.01); *H04B 7/026* (2013.01); *H04W 16/28* (2013.01); *H04B 7/0413* (2013.01); *H04W 88/04* (2013.01)

(58) Field of Classification Search
CPC .... H04B 7/0617; H04B 7/026; H04B 7/0413; H04W 16/28; H04W 88/04
See application file for complete search history.

(56) References Cited

U.S. PATENT DOCUMENTS

2007/0297498 A1  12/2007  Kramer
2012/0190309 A1  7/2012  Tang
(Continued)

FOREIGN PATENT DOCUMENTS

| EP | 2202904 A1 | 6/2010 | |
|---|---|---|---|
| WO | 2009064562 A2 | 5/2009 | |
| WO | WO 2010077291 A1 * | 7/2010 | ........... H04B 1/3822 |

OTHER PUBLICATIONS

Ali Mohamud Farah, Generalized and Quadratic Eigenvalue Problems with Hermitian Matrices, Feb. 21, 2013, University of Birmingham, UK.*

(Continued)

*Primary Examiner* — Alex Skripnikov
*Assistant Examiner* — Sharmin Chowdhury
(74) *Attorney, Agent, or Firm* — Slater Matsil, LLP

(57) ABSTRACT

System and method embodiments are provided for interference mitigation and signal enhancement in downlink wireless communications for MIMO systems with device-to-device communications across cooperating user terminals. In an embodiment, a network controller initializes a transmit covariance for beam-forming a transmit signal of the MIMO transmission from a base-station to a destination terminal and a relay terminal, and initializes a quantization noise covariance used for compressing a relay signal from the relay terminal to the destination. The transmit covariance and the quantization noise covariance are initialized in accordance with known channel state information and with statistics of noise and interference for transmit and relay channels. The transmit covariance and the quantization
(Continued)

noise covariance are then jointly optimized using an iterative algorithm in accordance with a capacity constraint on a relay link between the relay terminal and the destination terminal and a transmit signal power constraint of the base-station.

18 Claims, 7 Drawing Sheets

(51) Int. Cl.
*H04W 16/28* (2009.01)
*H04B 7/0413* (2017.01)
*H04W 88/04* (2009.01)

(56) References Cited

U.S. PATENT DOCUMENTS

2013/0114650 A1   5/2013   Li et al.
2014/0211687 A1   7/2014   Yu et al.

OTHER PUBLICATIONS

Sen Shao et al., Relay-assisted MIMO transmission with three-phase scheduling in cognitive radio networks, Mar. 1-3, 2010, Wireless Internet Conference (WICON), 2010.*

Roger A. Horn et al., Matrix Analysis, Cambridge University Press, 2012, p. 226-227.*

Ayoughi, et al., "Joint Optimal MIMO Transmission and Compression for Interface Mitigatioin with Cooperative Relay," Department of Electrical and Computer Engineering, University of Toronto, ON, M5S 3G4, Canada, Friday, Sep. 26, 2014, 7 pages.

Bertsekas, Dimitri P., "Nonlinear Programming," Second Edition, Athena Scientific, Belmont, Massachusetts, Sep. 1, 1999, 327 pages.

Del Coso, et al., "Distributed Compression for MIMO Coordinated Networks with a Backhaul Constraint," IEEE Transactions on Wireless Communications, vol. 8, No. 9, Sep. 2009, pp. 4698-4709.

Cover, et al., "Capacity Theorems for the Relay Channel," IEEE Transactions on Information Theory, vol. rr-25 No. 5, Sep. 1979, 13 pages.

CVX Research, Inc., "CVX: Matlab Software for Disciplined Convex Programming," Version 2.1, Jun. 2015, Build 1110, 3 pages.

Hanson, Morgan A., "On Sufficiency of the Kuhn-Tucker Conditions," Journal of Mathematical Analysis and Applications, 80, 1981, pp. 545-550.

Horn, et al., "Matrix Analysis," Second Edition, Cambridge University Press Oct. 31, 2012, 18 pages.

Kramer, et al., "Cooperative Strategies and Capacity Theorems for Relay Networks," IEEE Transactions on Information Theory, vol. 51, No. 9, Sep. 2005, 27 pages.

Simoens, et al.,"Compress-and-Forward Cooperative MIMO Relaying with Full Channel State Information," IEEE Transactions on Signal Processing, vol. 58, No. 2, Feb. 2010, 11 pages.

Zhang, et al., "Study of Gaussian Relay Channels with Correlated Noises," IEEE Transactions on Communications, vol. 59, Issue 3, Jan. 10, 2011, 24 pages.

Zhou, et al., "Capacity of the Gaussian Relay Channel with Correlated Noises to Within a Constant Gap," IEEE Communications Letters, 2012, 4 pages.

* cited by examiner

SYSTEM AND METHOD FOR JOINT MIMO TRANSMISSION AND COMPRESSION FOR INTERFERENCE MITIGATION WITH COOPERATIVE RELAY

This application claims the benefit of U.S. Provisional Application No. 62/057,122 filed on Sep. 29, 2014 by Seyed Arvin Ayoughi et al. entitled, "Joint Optimal MIMO Transmission and Compression for Interference Mitigation with Cooperative Relay," which is hereby incorporated herein by reference as if reproduced in its entirety.

TECHNICAL FIELD

The present invention relates to networking and wireless communications, and, in particular embodiments, to a system and method for joint multiple-input and multiple-output (MIMO) transmission and compression for interference mitigation with cooperative relay.

BACKGROUND

In MIMO systems, the capacity of a radio link is increased using multiple transmit and receive antennas to exploit multipath propagation in various orientations or directions. A base station or user terminal can send and/or receive more than one data signal on the same radio channel at the same time using multipath propagation. The user terminal is any user or mobile device capable of wireless communications with a network, such as a smartphone, a tablet, a laptop computer, or a sensor device. One of the challenges in current and evolving wireless communications networks, including MIMO systems, is the provisioning of high-rate downlink transmission for remote or cell-edge users. A user terminal at the edge of a cell has to account for not only the relatively weak direct signal from its own base station, but also strong interference from the neighboring base-stations. However, modern user terminals may be capable of establishing high-capacity out-of-band device-to-device links (e.g., by using WiFi, Bluetooth, or other wireless link technologies), such as when the terminals are located at sufficient proximity from each other. The physical proximity of the user terminals also suggests that the interference at the multiple terminals can be highly correlated. This opens up the possibility of utilizing device-to-device communications for interference mitigation and signal enhancement. A scheme that can take advantage of device-to-device communications to mitigate MIMO transmissions interference and enhance the signal at reception is needed.

SUMMARY OF THE INVENTION

In accordance with another embodiment, a method for receiving multiple-input and multiple-output (MIMO) transmission and relay channels using device-to-device communications includes receiving, at a destination terminal from a base-station, a transmit signal for the MIMO transmission. The transmit signal is beam-formed in accordance with a transmit covariance obtained by jointly optimizing the transmit covariance and a quantization noise covariance for compressing and relaying the transmit signal from a relay terminal to the destination terminal. The joint optimization of the transmit covariance and the quantization noise covariance is in accordance with known channel state information and with statistics of noise and interference for transmit and relay channels. The method further includes receiving, at the destination terminal from the relay terminal using the device-to-device communications, a relay signal obtained by compressing the transmit signal for the MIMO transmission. The relay signal is compressed by quantization in accordance with the quantization noise covariance. The destination node removes any interference in the received transmit signal and relay signal in accordance with correlated noise in the received transmit signal and relay signal.

In accordance with another embodiment, a method for establishing MIMO transmission and relay channels using device-to-device communications includes initializing, at a network controller, a transmit covariance for beam-forming a transmit signal of the MIMO transmission from a base-station to a destination terminal and a relay terminal, and initializing a quantization noise covariance used for compressing a relay signal from the relay terminal to the destination. The transmit covariance and the quantization noise covariance are initialized in accordance with known channel state information and with statistics of noise and interference for transmit and relay channels. The method further includes jointly optimizing the transmit covariance and the quantization noise covariance using an iterative algorithm in accordance with a capacity constraint on a relay link between the relay terminal and the destination terminal and a transmit signal power constraint of the base-station.

In accordance with another embodiment, a terminal for receiving MIMO transmission and relay channels using device-to-device communications includes a processor coupled to a memory, and a non-transitory computer readable storage medium storing programming for execution by the processor. The programming includes instructions to receive, from a base-station, a transmit signal for the MIMO transmission. The transmit signal is beam-formed in accordance with a transmit covariance obtained by jointly optimizing the transmit covariance and a quantization noise covariance for compressing and relaying the transmit signal from a relay terminal to the terminal. The joint optimization of the transmit covariance and the quantization noise covariance is in accordance with known channel state information and with statistics of noise and interference for transmit and relay channels. The programming further includes instructions to receive, from the relay terminal using the device-to-device communications, a relay signal obtained by compressing the transmit signal for the MIMO transmission. The relay signal is compressed by quantization in accordance with the quantization noise covariance. According to the programming, the terminal is also configured to remove any interference in the received transmit signal and relay signal in accordance with correlated noise in the received transmit signal and relay signal.

In accordance with yet another embodiment, a network controller for establishing MIMO transmission and relay channels using device-to-device communications includes a processor coupled to a memory, and a non-transitory computer readable storage medium storing programming for execution by the processor. The programming includes instructions to initialize a transmit covariance for beam-forming a transmit signal of the MIMO transmission from a base-station to a destination terminal and a relay terminal, and to initialize a quantization noise covariance used for compressing a relay signal from the relay terminal to the destination. The transmit covariance and the quantization noise covariance are initialized in accordance with known channel state information and with statistics of noise and interference for transmit and relay channels. The programming includes instructions to jointly optimize the transmit covariance and the quantization noise covariance using an iterative algorithm in accordance with a capacity constraint on a relay link between the relay terminal and the destination terminal and a transmit signal power constraint of the base-station.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
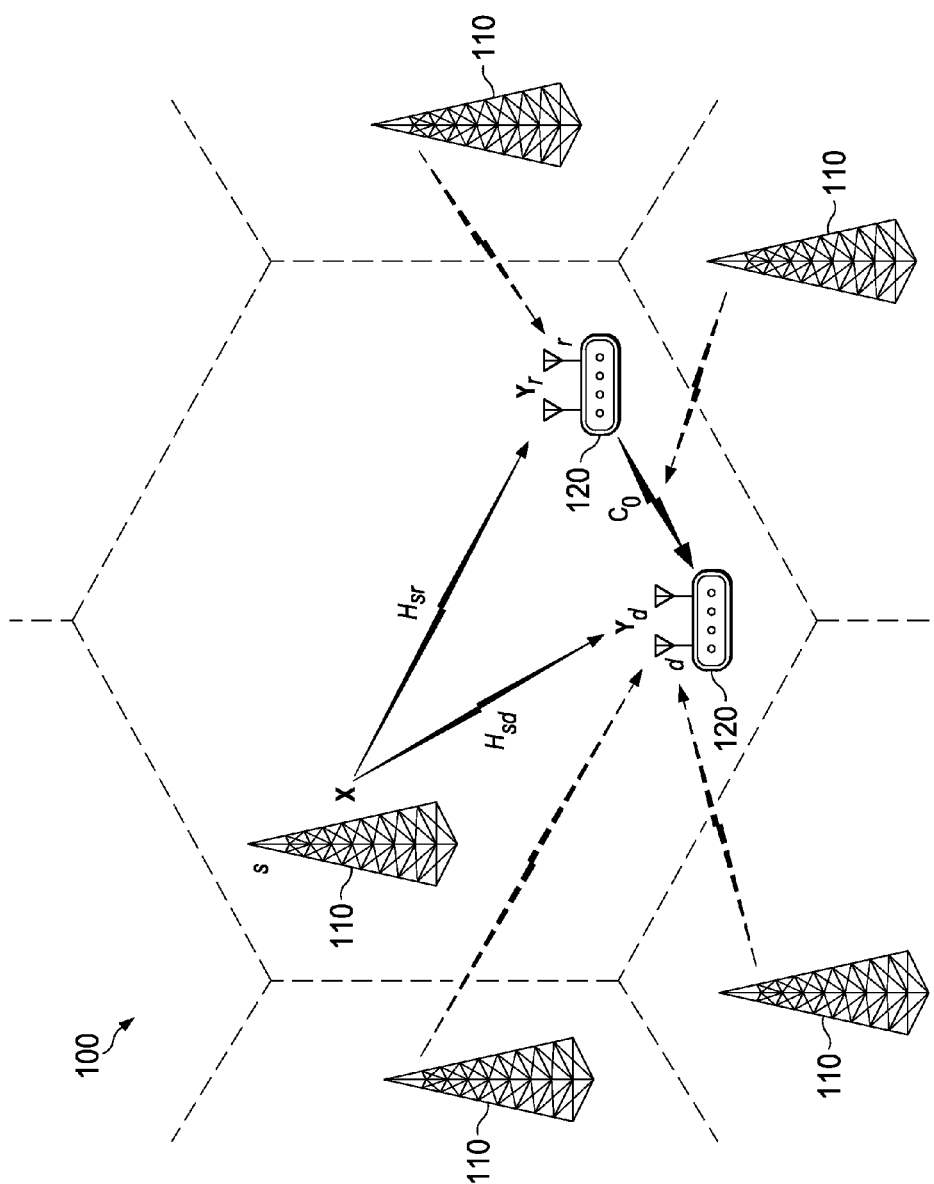
FIG. 1 illustrates of an embodiment wireless MIMO cellular system.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

System and method embodiments are provided for interference mitigation and signal enhancement in downlink wireless communications for MIMO systems. A MIMO multi-antenna joint reception scheme using device-to-device communications is used to enhance the detection of the intended signal and mitigate interference such as out-of-cell interference (from multiple cells or base-stations), across cooperating user terminals. Thus, the downlink transmission of remote or cell-edge users can be significantly improved. The cooperating terminals include a destination terminal intended to receive a signal from a base-station, and a relay terminal that compresses and forwards the signal from the base-station to the destination terminal via device-to-device communications. The compression is achieved by quantizing the signal in accordance with the finite capacity of the relay link. The multi-antennas of the destination and relay terminals are used, as an antenna pooling technique, for joint reception of the transmit signal from the base-station. The relay link allows two users to effectively pool their antennas together. This can enlarge the receiver dimensions thus allowing additional transmission degree-of-freedom from the base-station. Antenna pooling also enables joint interference rejection across the multiple user terminals, thus allowing more interference-free dimensions for direct transmission.

Assuming enough proximity between two cooperating terminals, the noise at the relay terminal and at the destination terminal is expected to be highly correlated. This correlation can be exploited to improve the signal to noise ratio at the destination upon receiving the signal from the source (base-station) and the compressed signal from the relay. The correlation of noise can be exploited to remove the interference from the signal at the destination and improve signal-to-noise ratio. The transmit signal with noise and the relay quantization noise are modeled with Gaussian statistics (Gaussian noise). The transmit beam-forming at the source (base-station) and the signal quantization at the relay can be optimized to mitigate interference and improve signal reception at the destination by a joint optimization of a transmit covariance matrix (for the transmit signal) and a relay quantization noise covariance matrix (for the quantization noise at the relay.

In an embodiment, the optimization problem for the joint transmit covariance and the relay quantization noise covariance can be solved by first keeping the transmit covariance matrix fixed and solving for the relay quantization covariance matrix in closed mathematical form. The transmit covariance matrix is then solved by keeping fixed the quantization noise covariance matrix obtained at the first step fixed. The two steps can be repeated, thereby implementing an iterative optimization that alternates between the two steps until reaching an optimum solution to the transmit and quantization noise covariance matrices. As described above, the solution takes advantage of the device-to-device cooperation link assuming noise correlation between the relay and the destination terminals. The solution can optimize the relay link and lead to significant throughput improvement by enabling joint reception and interference rejection across the multi-antenna relay and destination terminals. The alternating optimization approach includes simultaneous diagonalization of two covariance matrices, considering the MIMO relay channel with correlated noises at the destination and relay terminals.

In accordance with an example of the disclosure, a method for establishing MIMO transmission and relay channels using device-to-device communications is disclosed. The method includes sending, from a base-station to a destination terminal and a relay terminal, a transmit signal for the MIMO transmission. The transmit signal is beam-formed in accordance with a transmit covariance obtained by jointly optimizing the transmit covariance and a quantization noise covariance for compressing and relaying the transmit signal from the relay terminal to the destination terminal using the device-to-device communications. The joint optimization of the transmit covariance and the quantization noise covariance is in accordance with known channel state information and with statistics of noise and interference for transmit and relay channels. The method further includes receiving the transmit covariance from a network controller configured for jointly optimizing the transmit covariance and the quantization noise covariance in accordance with known channel state information and with statistics of noise and interference for transmit and relay channels.

In accordance with another example of the disclosure, a network component for establishing MIMO transmission and relay channels using device-to-device communications is disclosed. The network component includes a processor configured to send, to a destination terminal and a relay terminal, a transmit signal for the MIMO transmission. The transmit signal is beam-formed in accordance with a transmit covariance obtained by jointly optimizing the transmit covariance and a quantization noise covariance for compressing and relaying the transmit signal from the relay terminal to the destination terminal using the device-to-device communications. The joint optimizing of the transmit covariance and the quantization noise covariance is in accordance with known channel state information and with statistics of noise and interference for transmit and relay channels. The network component is a base-station. The network component is further configured to receive the transmit covariance from a network controller configured for jointly optimizing the transmit covariance and the quantization noise covariance in accordance with known channel state information and with statistics of noise and interference for the transmit and relay channels.

In accordance with another example of the disclosure, a method for supporting MIMO transmission and relay channels using device-to-device communications is disclosed. The method includes sending, from a relay terminal to a destination terminal using the device-to-device communications, a relay signal obtained by compressing a transmit signal for the MIMO transmission from a base-station. The relay signal is compressed by quantization in accordance with a quantization noise covariance obtained by jointly optimizing a transmit covariance and the quantization noise covariance. The joint optimization of the transmit covariance and the quantization noise covariance is in accordance with known channel state information and with statistics of noise and interference for transmit and relay channels. The method further includes receiving the quantization noise covariance from a network controller configured for jointly optimizing the transmit covariance and the quantization noise covariance in accordance with known channel state information and with statistics of noise and interference for transmit and relay channels.

In accordance with another example of the disclosure, a terminal for supporting MIMO transmission and relay channels using device-to-device communications is disclosed. The terminal includes a processor configured to send, to a destination terminal using the device-to-device communications, a relay signal obtained by compressing a transmit signal for the MIMO transmission from a base-station. The relay signal is compressed by quantization in accordance with a quantization noise covariance obtained by jointly optimizing a transmit covariance and the quantization noise covariance. The joint optimizing of the transmit covariance and the quantization noise covariance is in accordance with known channel state information and with statistics of noise and interference for transmit and relay channels. The terminal is a relay terminal for forwarding compressing and relaying the transmit signal from the base-station to the destination terminal. The terminal is further configured to receive the quantization noise covariance from a network controller configured for jointly optimizing the transmit covariance and the quantization noise covariance in accordance with known channel state information and with statistics of noise and interference for the transmit and relay channels.

FIG. 1 shows a wireless MIMO cellular system 100 according to an embodiment of the disclosure. The system 100 includes any number of base-stations 110 and user terminals 120. As an example, two cell-edge user terminals 120 are shown. A relay user terminal 120 cooperates with a destination user terminal 120 by relaying information, from a base-station 110, through a relay link between the two user terminals 120. The relay link may have a different frequency band than direct links between the user terminals 120 and the base-stations 110. The two user terminals 120 receive sources of interference from neighboring base-stations 110, resulting in a degree of correlation of noises at the relay and the destination user terminals 120.

Mathematically, the communication scenario considers a Gaussian MIMO relay channel with an out-of-band relay-to-destination link of fixed capacity $C_0$ bits per channel use. The source (base-stations 110), relay (user terminal 120), and destination (user terminal 120) are equipped with s, r, and d antennas, respectively. Let t be the total number of antennas from all the interfering base-stations 110 combined together. The received signals at the relay and destination are respectively:

$$Y_r = H_{sr}X + N_r, \text{ and} \qquad (1)$$

$$Y_d = H_{sd}X + N_d, \qquad (2)$$

where the Gaussian noises at the relay and the destination are correlated due to a common source of interference, i.e.:

$$N_r = H_{tr}X_I + N_1, \text{ and} \qquad (3)$$

$$N_d = H_{td}X_I + N_2, \text{ respectively.} \qquad (4)$$

The matrices, $H_{sr} \in \mathbb{C}^{r \times s}$ and $H_{sd} \in \mathbb{C}^{d \times s}$ are source-relay and source-destination channel matrices, respectively. The matrices $H_{tr} \in \mathbb{C}^{r \times t}$ and $H_{td} \in \mathbb{C}^{d \times t}$ are the interferers-to-relay and interferers-to-destination channel matrices, respectively. The noise functions $N_1 \sim CN(0_{r \times 1}, \sigma^2 I_r)$ and $N_2 \sim CN(0_{d \times 1}, \sigma^2 I_d)$ are additive and independent background noises at the relay and the destination, respectively. The vector $X \in \mathbb{C}^{s \times 1}$ is the transmit vector from the source under power constraint P. The vector $X_I \in \mathbb{C}^{t \times 1}$ is the interferer signal with $X_I \sim CN(0_{t \times 1}, S_{X_I})$, and is assumed to be Gaussian and independent of other signals.

The relay user terminal 120 implements a compress-and-forward strategy in which the relay quantizes its observation (i.e., the transmit signal with noise from the source) and sends the quantization index through the relay link to the destination. The quantization process may involve Wyner-Ziv coding, which accounts for the fact that the received signal at the destination is correlated with the relay observation, due to both the signal and the correlated noises. The achievable rate for compress-and-forward is:

$$\max_{p(X)p(\hat{Y}_r|Y_r)} I(X; \hat{Y}_r, Y_d) \qquad (5)$$

$$\text{s.t. } I(Y_r; \hat{Y}_r | Y_d) \leq C_0 \text{ and}$$

$$E\{X^\dagger X\} \leq P,$$

where $(\bullet)^\dagger$ denotes conjugate transpose.

The transmit signal with noise at the source is assumed to have a Gaussian distribution, e.g., $X \sim CN(0_{s \times 1}, S_X)$. The Gaussian quantization noise at the relay can be modeled as:

$$\hat{Y}_r = Y_r + Q, \quad (6)$$

where $Q \sim CN(0_{r \times 1}, S_Q)$. In this case, the optimization for joint transmission and compression problem becomes:

$$\max f_o(S_X, S_Q)$$

$$s.t. f_c(S_X, S_Q) \leq C_0, \text{ and}$$

$$S_X \geq 0, S_Q \geq 0, tr(S_X) \leq P. \quad (7)$$

The objective function is expressed as:

$$f_o(S_X, S_Q) = I(X; Y_r, Y_d) \quad (8)$$

$$= h(Y_r, Y_d) - h(Y_r, Y_d | X)$$

$$= \log \left| H S_X H^\dagger + S_{int} + \sigma^2 I_{(r+d)} + \begin{bmatrix} S_Q & 0_{r \times d} \\ 0_{d \times r} & 0_{d \times d} \end{bmatrix} \right| - $$

$$\log \left| S_{int} + \sigma^2 I_{(r+d)} + \begin{bmatrix} S_Q & 0_{r \times d} \\ 0_{d \times r} & 0_{d \times d} \end{bmatrix} \right|.$$

The constraint is expressed as:

$$f_c(S_X, S_Q) = I(Y_r; Y_r | Y_d) \quad (9)$$

$$= h(Y_r, Y_d) - h(Y_d) - h(Q)$$

$$= \log \left| H S_X H^\dagger + S_{int} + \sigma^2 I_{(r+d)} + \begin{bmatrix} S_Q & 0_{r \times d} \\ 0_{d \times r} & 0_{d \times d} \end{bmatrix} \right| - $$

$$\log \left| H_{sd} S_X H_{sd}^\dagger + S_{int}^{(2,2)} + \sigma^2 I_d \right| - \log |S_Q|,$$

and $H = [H_{sr}^\dagger H_{sd}^\dagger]^\dagger$ is the overall channel matrix. The interference covariance matrix is expressed as:

$$S_{int} = \begin{bmatrix} S_{int}^{(1,1)} & S_{int}^{(1,2)} \\ S_{int}^{(2,1)} & S_{int}^{(2,2)} \end{bmatrix} = \begin{bmatrix} H_{tr} S_{X_t} H_{tr}^\dagger & H_{tr} S_{X_t} H_{td}^\dagger \\ H_{td} S_{X_t} H_{tr}^\dagger & H_{td} S_{X_t} H_{td}^\dagger \end{bmatrix}. \quad (10)$$

The solution to the optimization problem above determines the optimized transmit beam-forming at the source (base-station) and the signal quantization at the relay to mitigate interference and improve signal reception at the destination. The optimization finds the optimal transmit signal vector for the source and the optimal quantized relay channel vector at the relay under a link capacity constraint for the relay and a transmit power constraint for the transmit signal. The optimization problem can be solved at a centralized location with knowledge of channel state information and the statistics of noise and interference. The problem is not a convex optimization problem, as the objective function and the constraint are concave in $S_X$ and convex in $S_Q$. An iterative optimization approach is used to find an optimum of the Lagrangian of the optimization problem. To solve the problem, the Lagrangian is maximized using an iterative optimization approach. The Lagrangian of the optimization problem can be expressed as:

$$L(S_X, S_Q, \mu) = f_o(S_X, S_Q) - \mu(f_c(S_X, S_Q) - C_0). \quad (11)$$

The overall optimization approach for solving the problem is to find the optimal $(S^*_X, S^*_Q)$ that maximizes the Lagrangian for a fixed Lagrangian dual variable $\mu$. Specifically, for fixed variable $\mu$ the following optimization problem is first solved for optimal $(S^*_X, S^*_Q)$:

$$\max_{S_{X_s} \geq 0, S_Q \geq 0, tr(S_{X_s}) \leq P} L(S_X, S_Q, \mu). \quad (12)$$

Subsequently, the optimal value $\mu^*$ that results in:

$$f_c(S^*_X, S^*_Q) = C_0 \quad (13)$$

is found in an outer loop.

In some embodiments, the optimal $\mu^*$ is between 0 and 1. When $\mu=0$ (e.g., when the objective is to maximize the overall rate without relay link capacity constraint), the optimal $S^*_Q$ is a zero matrix, resulting in $f_c(S^*_X, S^*_Q) = \infty$. When $\mu \geq 1$, the overall objective penalizes the relay link rate at more than a 1:1 ratio with the achievable rate, and the optimal $S^*_Q$ may be infinite, resulting in $f_c(S^*_X, S^*_Q) = 0$. The Lagrangian maximization problem $$\max_{S_{X_s} \geq 0, S_Q \geq 0, tr(S_{X_s}) \leq P} L(S_X, S_Q, \mu)$$

is solved with a fixed $\mu \in (0,1)$. The outer loop for searching for the optimal $\mu^*$ is a one-dimensional root-finding problem that can be solved using a numerical approach such as bisection.

The Lagrangian maximization problem of equation (12) can be solved using an iterative coordinate ascent approach. The solution approach is to find the optimal $S_Q$ that maximizes $L(S_X, S_Q, \mu)$ for fixed $S_X$, then to find the optimal $S_X$ that maximizes $L(S_X, S_Q, \mu)$ for fixed $S_Q$, and to iterate between the two steps. For fixed $\mu \in (0,1)$, each of the individual optimizations of $S_X$ and $S_Q$ can be solved to optimality. The iterative optimization process provides a non-decreasing sequence of the Lagrangian objective, so that the iterative process converges. The convergent point is a stationary point. This solution algorithm for achieving joint transmission and quantization is summarized in Table 1 below. The algorithm details for optimizing $S_Q$ for fixed $S_X$, and for optimizing $S_X$ for fixed $S_Q$ are described further below.

TABLE 1

Joint Input and Quantization Algorithm

1: Initialize $S_x \geq 0$ such that $tr(S_x) = P$;
2: repeat
3:      For each fixed $\mu$:
4:      repeat
5:          Find optimal $S_Q$ for fixed $S_x$;
6:          Find optimal $S_x$ for fixed $S_Q$;
7:      until $(S_Q, S_x)$ converges;
8:      Update $\mu$ using bisection;
9: until $f_c(S_X, S_Q) = C_0$.

Figure 2:
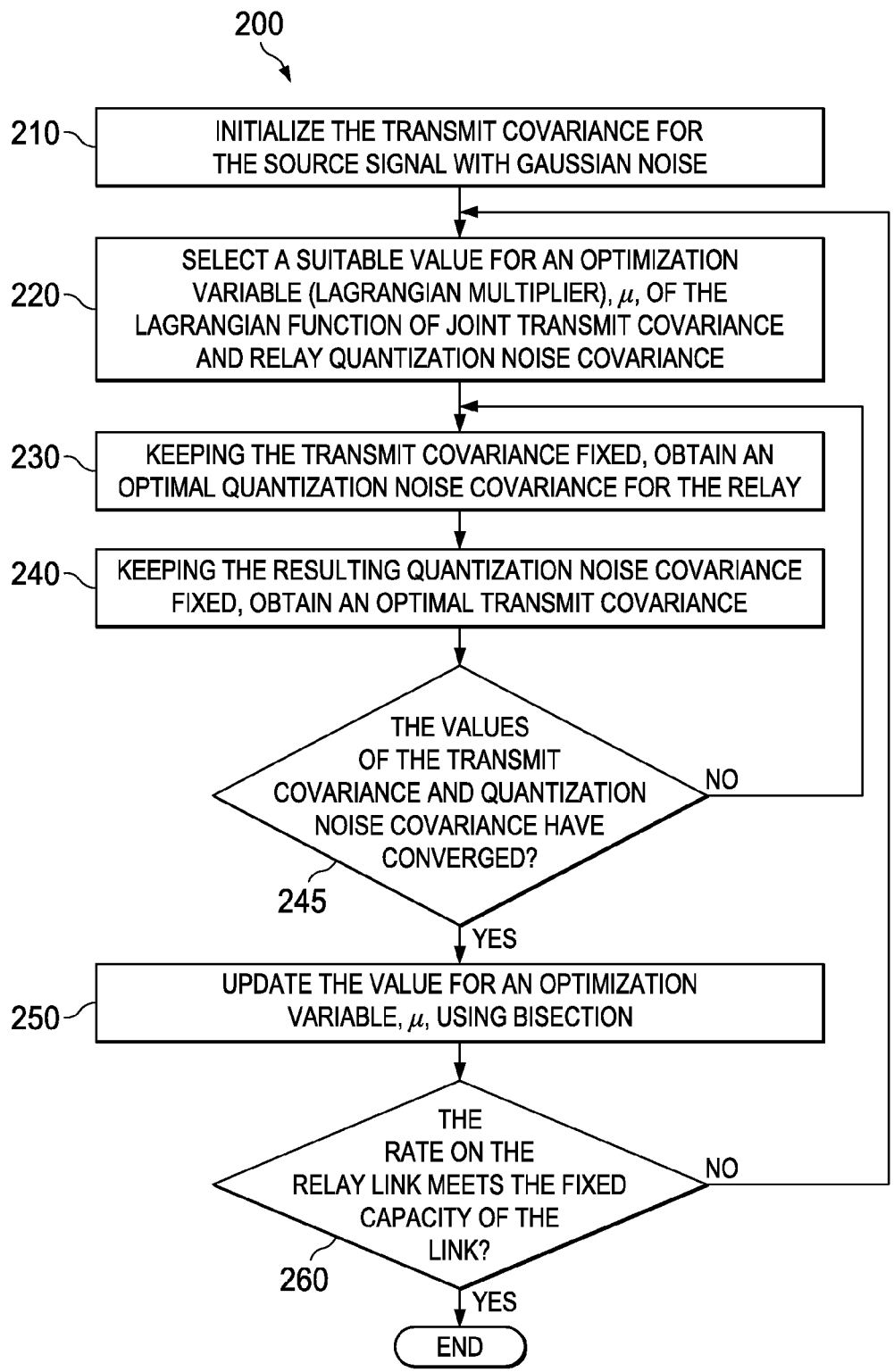
FIG. 2 illustrates another embodiment method for joint transmit and quantization noise covariance optimization.

FIG. 2 is a flowchart illustrating an embodiment method 200 for joint transmit and quantization covariance optimization according to the algorithm above. The method 200 can be implemented by a network controller for optimizing jointly the transmit beam-forming signal from the source (base-station) and the compression of the signal by the relay terminal to the destination. The network controller may be located at the transmit base-station or a separate entity of the network. At step 210, the transmit covariance for the source with Gaussian noise is initialized to some suitable value. The transmit covariance determines the transmit vector for beam-forming at the source. This is step 1 in the algorithm of Table 1. At step 220, a suitable value for an optimization variable (Lagrangian multiplier), μ, of a Langrangian function of joint transmit covariance and relay quantization noise covariance is selected. This is step 3 in the algorithm above. The quantization noise covariance determines the quantization of the signal received at the relay and relayed to the destination. At step 230, the quantization noise covariance at the relay is obtained, keeping the transmit covariance fixed. This is shown in step 5 of the algorithm. At step 240, an optimal transmit covariance is obtained, keeping the resulting quantized noise covariance fixed. At decision step 245, the method checks whether the transmit covariance and quantization noise covariance values have converged. If the values converged, then the method 200 proceeds to step 250. Otherwise, the method returns to step 230. This is shown in step 6 of the algorithm. At step 250, the value of the optimization variable, μ, is updated using bisection and the last calculated values of the covariance matrices. At a decision step 260, the method checks whether the rate on the relay link, according to the quantization, meets the fixed capacity of the relay link. If the quantization signal rate meets the capacity of the relay link, then the method 200 ends. Otherwise, the method returns to step 220. The resulting optimized transmit covariance and quantization noise covariance are used to determine the optimal transmit signal beam-forming at the source and the quantization signal form the relay to the destination, respectively, to mitigate interference and improve signal reception at the destination for the MIMO transmission from the source.

To optimize $S_Q$ for fixed $S_X$, a closed form solution is applied to find $S_Q$ that maximizes the Lagrangian for a given $\overline{S}_X$, i.e., the optimum solution to $$\max_{S_Q \geq 0} L(\overline{S}_X, S_Q, \mu). \tag{14}$$

The solution seeks to find a stationary point of the problem. One technique that makes a closed form solution possible is simultaneous diagonalization by congruence. For the optimization over $S_Q$ when $S_X$ is kept fixed, the objective and constraint functions of equations (8) and (9) can be rewritten as:

$$f_o = \log|S_{Y_r|Y_d} + S_Q| - \log|S_{Y_r|Y_d,X} + S_Q| + \text{const, and} \tag{15}$$

$$f_c = \log|S_{Y_r|Y_d} + S_Q| - \log|S_Q| + \text{const.} \tag{16}$$

The Lagrangian of equation (14) can now be written as:

$$L(\overline{S}_X, S_Q, \mu) = (1-\mu)\log|S_{Y_r|Y_d} + S_Q| + \mu \log|S_Q| - \log|S_{Y_r|Y_d,X} + S_Q| + \text{const.} \tag{17}$$

where the conditional covariances $S_{Y_r|Y_d}$ and $S_{Y_r|Y_d,X}$ are obtained using Schur's complement formula $$S_{Y_r|Y_d} = H_{sr}S_XH_{sr}^\dagger + S_{int}^{(1,1)} + \sigma^2 I_r - \left(H_{sr}S_XH_{sd}^\dagger + S_{int}^{(1,2)}\right)$$

$$\left(H_{sd}S_XH_{sd}^\dagger + S_{int}^{(2,2)} + \sigma^2 I_d\right)^{-1}(H_{sd}S_XH_{sr}^\dagger + S_{int}^{(2,1)}), \text{ and}$$

$$S_{Y_r|Y_d,X} = H_{sr}S_XH_{sr}^\dagger + S_{int}^{(1,1)} + \sigma^2 I_r - [\ H_{sr}S_XH_{sd}^\dagger + S_{int}^{(1,2)} \quad H_{sr}S_X\ ]$$

$$\begin{bmatrix} H_{sd}S_XH_{sd}^\dagger + S_{int}^{(2,2)} + \sigma^2 I_d & H_{sd}S_X \\ S_XH_{sd}^\dagger & S_X \end{bmatrix}^+ \begin{bmatrix} H_{sd}S_XH_{sr}^\dagger + S_{int}^{(2,1)} \\ S_XH_{sr}^\dagger \end{bmatrix},$$

where $(\cdot)^+$ denotes Moore-Penrose pseudoinverse. The goal is to maximize equation (17) over $S_Q$. The constraint $S_Q \geq 0$ is superfluous, since it is already implicit in the domain (e.g., if $|S_Q|=0$, then the relay link rate becomes infinity). The main step in maximizing equation (18) is the simultaneous diagonalization of $S_{Y_r|Y_d,X}$ and $S_{Y_r|Y_d}$. The solution is based on a Lemma that there exists a non-singular matrix $C \in \mathbb{C}^{r \times r}$ such that $C^\dagger S_{Y_r|Y_d}C = I_r$ and $C^\dagger S_{Y_r|Y_d,X}C = \Lambda$, where $\Lambda$ is a diagonal matrix. The diagonal elements of $\lambda_i$ are called generalized eigenvalues. Moreover, $\lambda_i \in (0,1]$ for $i=1, \ldots, r$. As proof, both $S_{Y_r|Y_d}$ and $S_{Y_r|T_d,X_s}$ are positive definite matrices. Let $S_{Y_r|Y_d}^{-1} = R^\dagger R$ be a Cholesky decomposition. Considering the eigendecomposition $RS_{Y_r|Y_d,X}R^\dagger = V\Lambda V^\dagger$, $C=R^\dagger V$ satisfies $C^\dagger S_{Y_r|Y_d}C = I_r$ and $C^\dagger S_{Y_r|Y_d,X}C = \Lambda$ simultaneously. Moreover, since $C$ is non-singular, $S_{Y_r|Y_d} \geq S_{Y_r|Y_d,X}$ implies $\Lambda \geq I_r$. For the general correlated noise case, the above simultaneous diagonalization is used to reduce the matrix optimization problem to scalar optimization.

To reduce the MIMO transmission problem to the scalar case and to solve the subsequent scalar quantization noise optimization problem, the Lagrangian of equation (17) can be written as:

$$L(\overline{S}_X, S_Q, \mu) \stackrel{(a)}{=} (1-\mu)\log\left|\Lambda \hat{S}_Q^{-1} + I_r\right| - \log\left|\Lambda \hat{S}_Q^{-1} + I_r\right| + \text{const} \stackrel{(b)}{\leq} \tag{18}$$

$$(1-\mu)\log\left|\Lambda \sum_Q^{-1} + I_r\right| - \log\left|\sum_Q^{-1} + I_r\right| + \text{const},$$

where (a) follows from the change of variable $\overline{S}_Q = C^\dagger S_Q C$, with C as in the Lemma above, and where $\Sigma_Q$ in (b) follows comes from the eigen-decomposition $\overline{S}_Q = U\Sigma_Q U^\dagger$. The equality in (b) is obtained with $U=I_r$. Thus, it is without loss of optimality to restrict $\overline{S}_Q$ to be diagonal.

Let $\Sigma_Q^{ii}$ be the diagonal entries of $\Sigma_Q$. The following change of variable is considered:

$$c_i = \log\left(1 + \frac{\lambda_i}{\Sigma_Q^{ii}}\right), i = 1, \ldots, r, \tag{19}$$

where $\Sigma_Q^{ii} \geq 0$ and $c_i \geq 0$. An interpretation of $c_i$ is that it is the portion of the variable $C_0$ assigned for compression of the $i^{th}$ element of $CY_r$. Using equation (19), the Lagrangian can be written as:

$$L = \sum_{i=1}^{r}((1-\mu)c_i - \log(2^{c_i} + \lambda_i - 1)) + \text{const.} \tag{20}$$

It can be checked that equation (20) is concave in $c_i$ when $\lambda_i \geq 1$. The optimal $c_i$ is given by:

$$c_i^* = \left[\log\frac{(1-\mu)(\lambda_i - 1)}{\mu}\right]^+ \tag{21}$$

The optimal $\Sigma_Q^{ii}$ is given by:

$$\sum_Q^{ii} = \begin{cases} \dfrac{\mu}{1 - \dfrac{1}{\lambda_i} - \mu} & \mu < 1 - \dfrac{1}{\lambda_i} \\ +\infty & \mu \geq 1 - \dfrac{1}{\lambda_i} \end{cases} \quad (22)$$

and the optimal $S_Q$ is given by $S^*_Q = C^{-\dagger}\Sigma^*_Q C^{-1}$.

To optimize $S_X$ for fixed $S_Q$, the following optimization problem:

$$\max_{S_X \succeq 0, tr(S_X) \leq P} L(S_X, \bar{S}_Q, \mu) \quad (26)$$

can be solved using tools used in convex optimization, where for a fixed $\bar{S}_Q$, the Lagrangian in equation (11) is a concave function of $S_X$, if $\mu \in (0,1)$. To verify the convexity, it is noted that the Lagrangian in equation (11) can be written as a function of $S_X$ (for fixed $\bar{S}_Q$) as $$L(S_X, \bar{S}_Q, \mu) = f_o(S_X, \bar{S}_Q) - \mu f_c(S_X, \bar{S}_Q) + \text{const.} =$$

$$(1-\mu)\log \left| HS_X H^\dagger + S_{int} + \sigma^2 I_{(r+d)} + \begin{bmatrix} \bar{S}_Q & 0_{r \times d} \\ 0_{d \times r} & 0_{d \times d} \end{bmatrix} \right| +$$

$$\mu \log \left| H_{sd} S_X H_{sd}^\dagger + S_{int}^{(2,2)} + \sigma^2 I_d \right| + \text{const.}$$

For $\mu \in (0,1)$, the formulation is a log det optimization problem which is convex and can be solved using a numerical software package such as CVX for Matlab.

Figure 3:
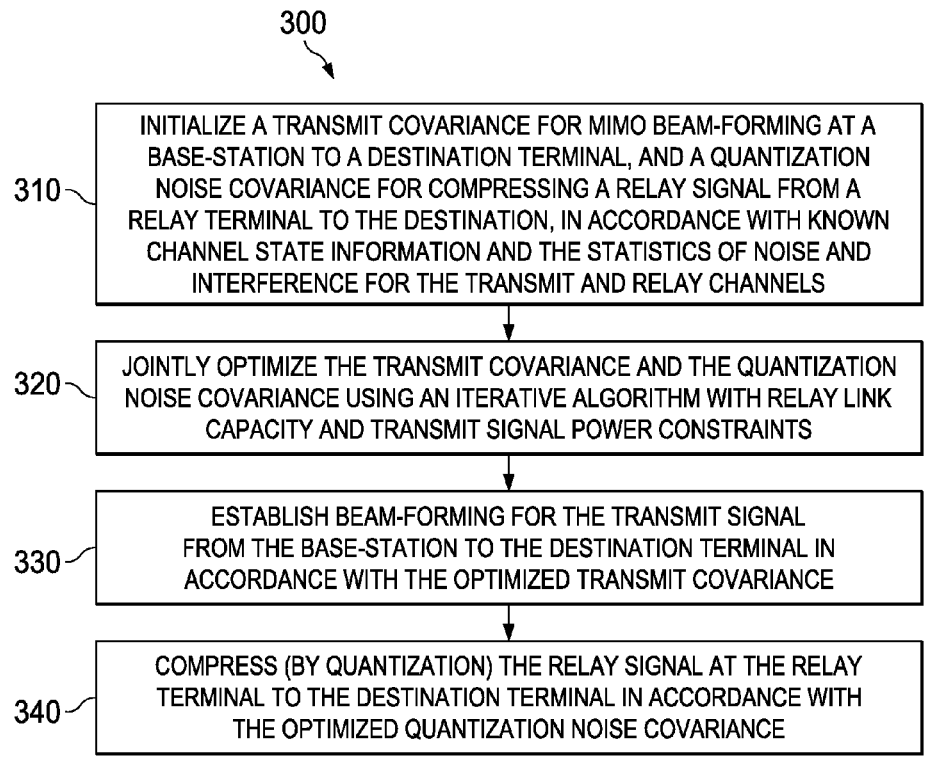
FIG. 3 illustrates an embodiment method for a compress-and-forward relay scheme with joint MIMO transmission using joint transmit and quantization noise covariance optimization.

FIG. 3 is a flowchart illustrating an embodiment method 300 for a compress-and-forward relay scheme with joint MIMO transmission using joint transmit and quantization noise covariance optimization. At step 310, a transmit covariance matrix, function or value for MIMO beam-forming at a base-station to a destination terminal, and a quantization noise covariance matrix, function or value for compressing the relay signal from a relay terminal to the destination are initialized in accordance with known channel state information and the statistics of noise and interference for the transmit and relay channels. At step 320, the transmit covariance and the quantization noise covariance are jointly optimized using an iterative algorithm with relay link capacity and transmit signal power constraints. The solution includes maximizing a Langrangian function of the two covariance matrices with an optimum Lagrangian variable. The optimization can be solved using the method 200 or the algorithm of Table 1. Steps 310 and 320 can be performed at the network controller or base-station. At step 330, the transmit signal from the base-station to the destination terminal is beam-formed in accordance with the optimized transmit covariance. This step can be performed at the base-station or the network controller. For instance, the network controller can send the optimized transmit covariance to the base-station. At step 340, the relay signal at the relay terminal to the destination terminal is compressed or quantized in accordance with the optimized quantization noise covariance. This step can be performed at the relay terminal. For instance, the network controller can send the optimized quantization noise covariance to the relay terminal.

Figure 4:
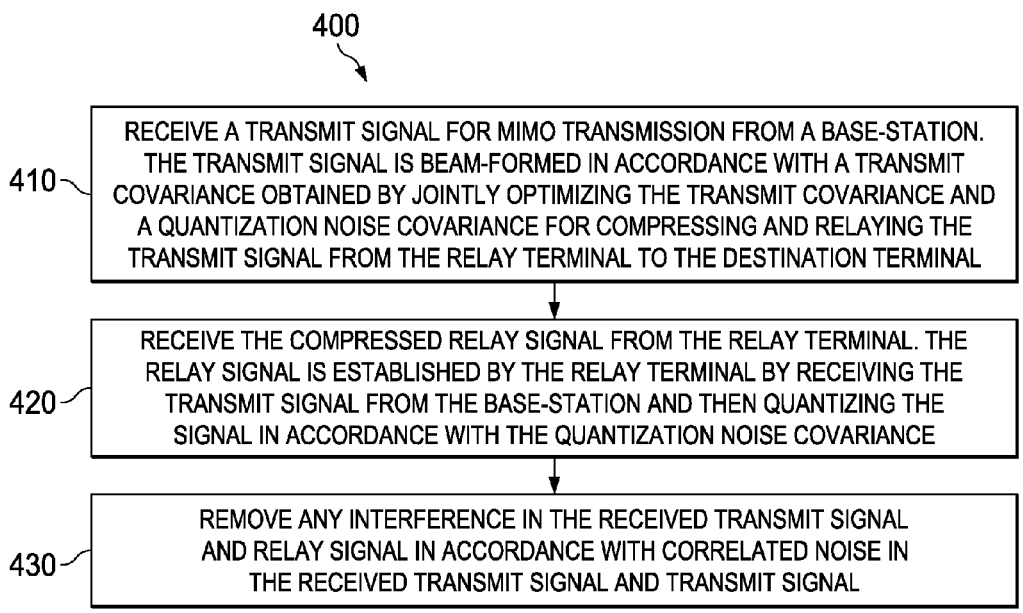
FIG. 4 illustrates another embodiment method for a compress-and-forward relay scheme with joint MIMO transmission using joint transmit and quantization noise covariance optimization.

FIG. 4 is a flowchart illustrating another embodiment method 400 for a compress-and-forward relay scheme with joint MIMO transmission using joint transmit and quantization noise covariance optimization. The method can be performed by a destination terminal that receives a transmit signal from a base-station and a compressed relay signal from a relay terminal. At step 410, a transmit signal for MIMO transmission is received from the base-station. The transmit signal is beam-formed in accordance with a transmit covariance matrix, function or value obtained by jointly optimizing the transmit covariance and a quantization noise covariance matrix, function or value. The quantization noise covariance is used for compressing and relaying the transmit signal from the relay terminal to the destination terminal. At step 420, the compressed relay signal is received from the relay terminal. The relay signal is established by the relay terminal by receiving the transmit signal from the base-station and then quantizing the signal in accordance with the quantization noise covariance. At step 430, any interference in the received transmit signal and relay signal is removed in accordance with correlated noise in the received transmit signal and transmit signal.

Simulation studies are performed to demonstrate the effectiveness of the compress-and-forward relaying scheme described above for device-to-device link to enhance cell-edge throughput in a downlink wireless cellular environment. The scheme applies the joint input and quantization covariance optimization above, such as using the method 200. A pico-cell deployment is considered with a pico-base-station transmitting at a maximum power of 1 Watt over 10 Megahertz (MHz) to a user distance of 100 meter (m) away. A second user located nearby acts as a relay as shown in FIG. 1. The background noise power spectral density is assumed to be −170 Decibel-milliwatt/Hertz (dBm/Hz). A channel model with pathloss exponent of 3.76 and 8 decibel (dB) shadowing is used.

As reference, the cut-set upper bound to the capacity of a MIMO relay channel is formed as:

$$C \leq \max_{p(X), E\{X^\dagger X\} \leq P} \min\{I(X; Y_r, Y_d), I(X; Y_d) + C_0\} \quad (37)$$

The evaluation of the cut-set bound involves solving an optimization problem. For the Gaussian MIMO relay channel, the optimal input distribution in the maximization problem of equation (37) is multivariate Gaussian. The optimization over the input covariance matrix is a convex optimization problem, which can be solved using standard optimization package such as CVX.

Figure 5:
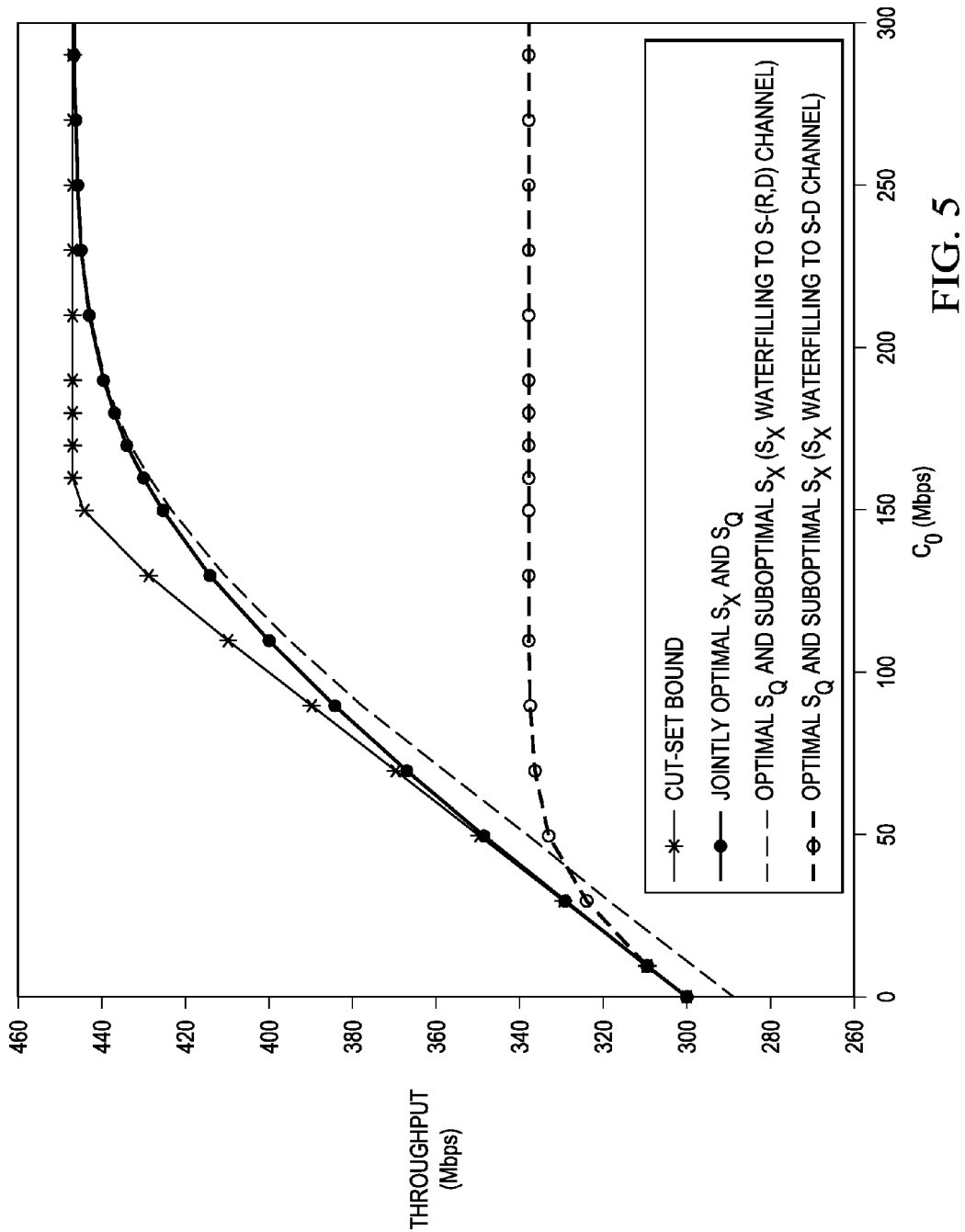
FIG. 5 illustrates a graph of simulation results for different optimization algorithms.

FIG. 5 is graph that demonstrates the effect of antenna pooling for enhancing the direct communication between the base-station and the user. The graph shows the improvement in overall transmission rate using a relay link for a scenario where the transmitting base-station has two antennas (s=3), the relay and destination are each equipped with 2 antennas (r=2 and d=2), and with no intercell interference (t=0). In this scenario, the benefit of antenna pooling is in enhancing the direct signal dimension, as the overall transmission degree-of-freedom is limited by the number of antennas at the destination. Thus, pooling antennas from the relay can improve the overall throughput considerably. As shown in FIG. 5, at $C_0$=100 Megabits/second (Mbps), the improvement in throughput by the optimized compress-and-forward relay scheme is around 95 Mbps, achieving an almost 1:1 improvement in the direct transmission rate for each relaying bit. The maximum possible improvement is around 165 Mbps which is achieved with $C_0$=250 Mbps. For smaller values of $C_0$, the achievable rate of the optimized compress-and-forward scheme almost meets the cut-set bound.

The graph also demonstrates the effect of optimizing the input covariance matrix on the overall achievable rates. As suboptimal choices for input covariance, the achievable rates are plotted for the cases where the transmit covariance is set to be the water-filling covariance of the source-to-destination and source-to-relay-and-destination point-to-point channels, respectively, without considering the effect of the relay. For this fixed input covariance matrix, the quantization noise covariance is optimized. Depending on the value of $C_0$, each of these covariances can be strictly suboptimal. For small values of $C_0$, setting the input covariance to optimize for the source-to-destination channel is close to optimal. However, as $C_0$ increases, this $S_X$ may fail to achieve the optimal performance. For large values of $C_0$, setting the input to optimize for the source-to-relay-and-destination channel is close to optimal, but a gap exits when $C_0$ is low.

Figure 6:
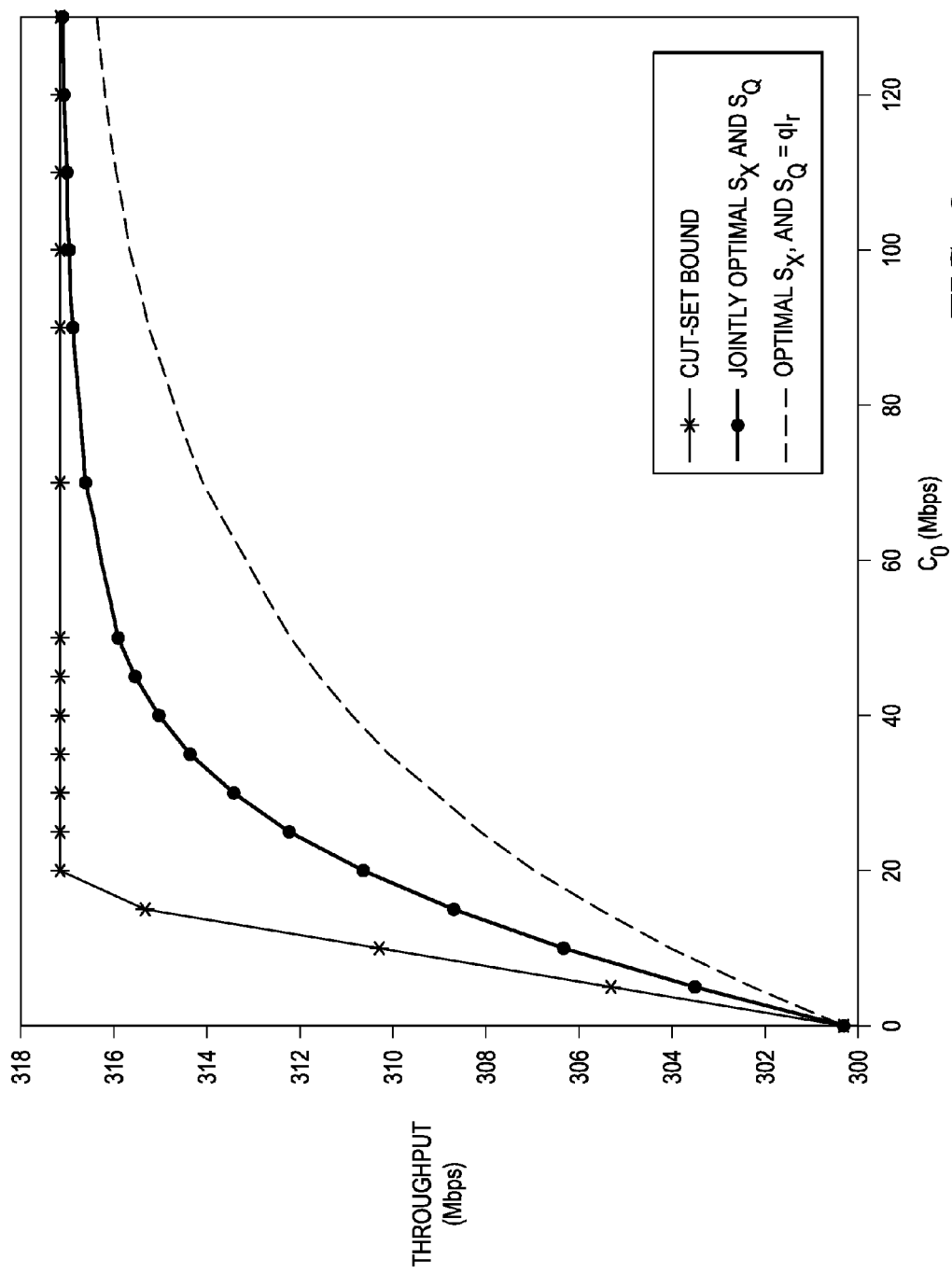
FIG. 6 illustrates a graph of additional simulation results for different optimization algorithms.

FIG. 6 is graph that demonstrates the results for a similar setup to the scenario above, except that the transmitting base-station now has two antennas, and the relay and destination are equipped with three antennas each, again with no interference (i.e., s=2, r=3, d=3, and t=0). In this scenario relaying does not increase the overall throughput notably, because the overall degree-of-freedom is constrained by the number of base-station antennas instead of number of antennas at the destination. In this case, with $C_0$=100 Mbps, the throughput improvement is only around 17 Mbps.

Figure 7:
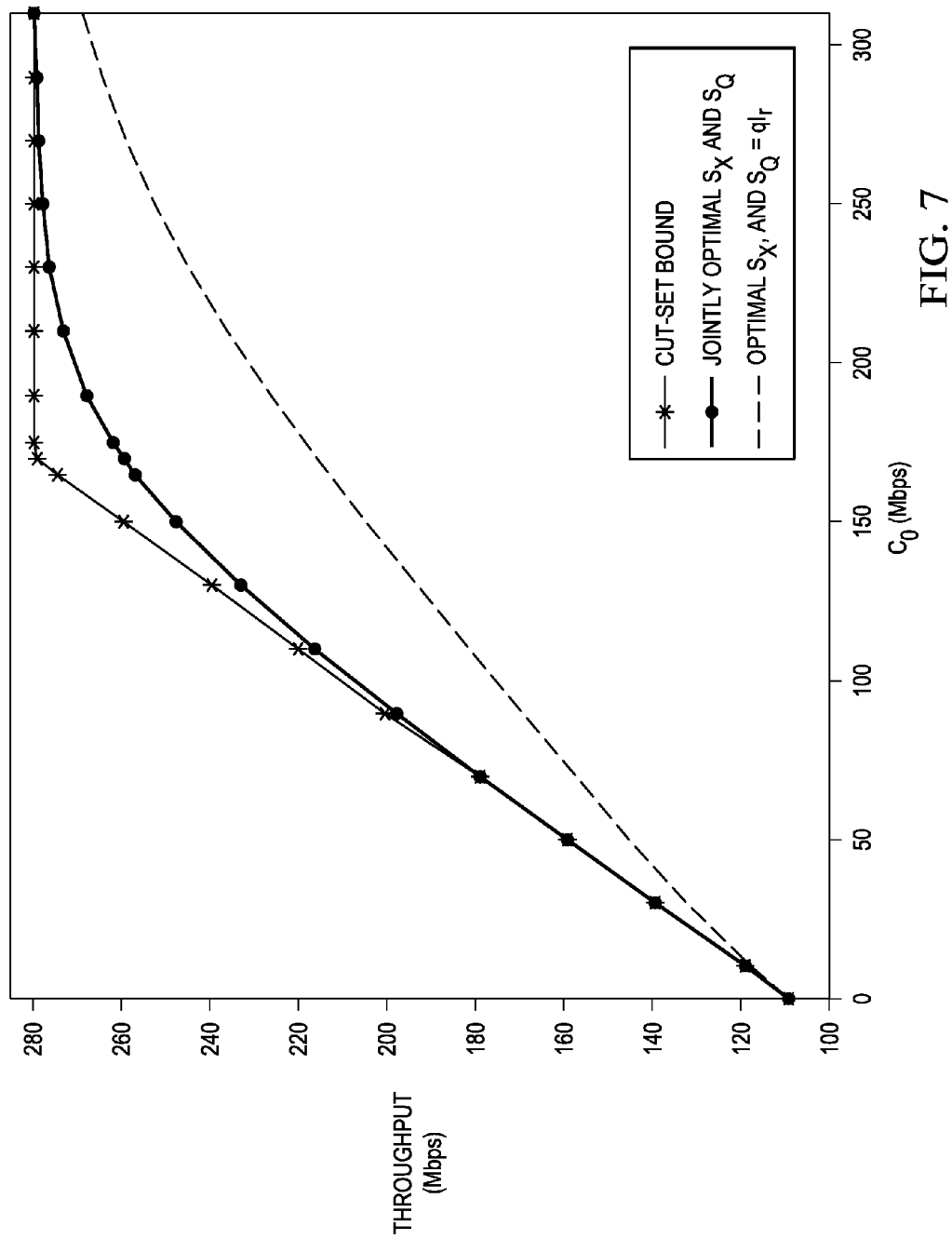
FIG. 7 illustrates a graph of yet additional simulation results for different optimization algorithms.

FIG. 7 is graph that demonstrates the results considering the same setup as the scenario of FIG. 6. However, the scenario of FIG. 7 also considers four additional interfering single-antenna pico-base-stations, as shown in FIG. 1 (i.e., s=2, r=3, d=3, and t=4). The interfering base-stations are placed on hexagonal grid 200 m away from the center base-station. Due to interference, the throughput without the relay (i.e., with $C_0$=0) is now considerably lower, but the optimized use of the relay link is able to improve the throughput significantly. This is because, due to the common inter-cell interference, the noises at the relay and destination are highly correlated. By exploiting such noise correlation using the relay link, the destination can effectively pool the three relay antennas together with the three existing antennas of its own to create a 2×6 overall MIMO channel (i.e., s=2, r+d=6). This enables the rank-four interference (i.e., t=4) to be rejected completely, creating an effective 2×2 interference-free overall channel. As seen in the graph of FIG. 7, at around $C_0$=100 Mbps, the improvement in throughput brought by the optimized use of the compress-and-forward relay link is around 85 Mbps. At small $C_0$, relaying achieves almost 1:1 improvement in the direct transmission rate for each relaying bit. It is worth noting that the overall throughput at large $C_0$ in FIG. 7 is close to the achievable rate of the $C_0$=0 scenario in FIGS. 5 and 6, illustrating the almost complete interference rejection capability of optimized compress-and-forward relaying.

FIGS. 6 and 7 also demonstrate the importance of optimizing the quantization noise covariance matrix. For comparison purpose, the achievable rate for a simple suboptimal $S_Q$ is also shown, where $S_Q=qI_r$, q is set to satisfy the relay rate constraint with equality, for the optimal $S_X$ obtained from the joint input and quantization algorithm in Table 1. This simple choice of $S_Q$ results in suboptimal performance as shown in FIGS. 6 and 7.

Figure 8:
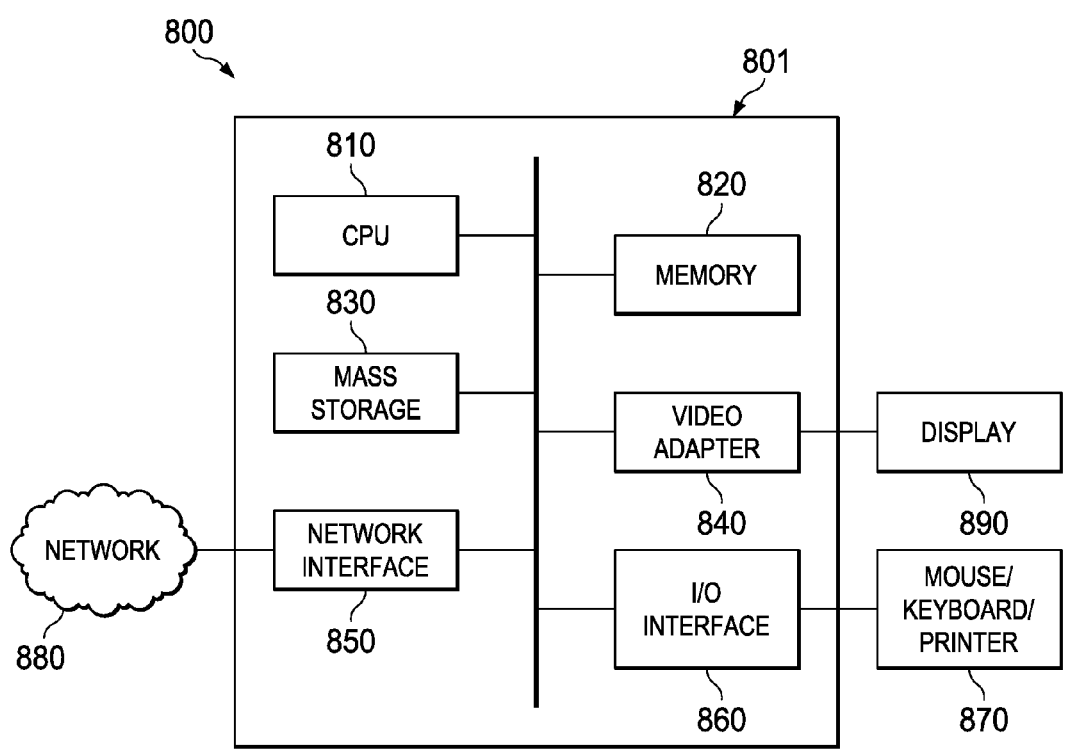
FIG. 8 illustrates a block diagram of an embodiment computing platform to implement various embodiments.

FIG. 8 is a block diagram of a processing system 800 that can be used to implement various embodiments. For example, the system can be part of a network entity or component, such as a base-station, a user terminal, or any network controller configured to implement the optimization techniques described herein for compress-and forward relaying. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 800 may comprise a processing unit 801 equipped with one or more input/output devices, such as a speaker, microphone, mouse, touchscreen, keypad, keyboard, printer, display, and the like. The processing unit 801 may include a central processing unit (CPU) 810, a memory 820, a mass storage device 830, a video adapter 840, and an I/O interface 860 connected to a bus. The bus may be one or more of any type of several bus architectures including a memory bus or memory controller, a peripheral bus, a video bus, or the like.

The CPU 810 may comprise any type of electronic data processor. The memory 820 may comprise any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs. In embodiments, the memory 820 is non-transitory. The mass storage device 830 may comprise any type of storage device configured to store data, programs, and other information and to make the data, programs, and other information accessible via the bus. The mass storage device 830 may comprise, for example, one or more of a solid state drive, hard disk drive, a magnetic disk drive, an optical disk drive, or the like.

The video adapter 840 and the I/O interface 860 provide interfaces to couple external input and output devices to the processing unit. As illustrated, examples of input and output devices include a display 890 coupled to the video adapter 840 and any combination of mouse/keyboard/printer 870 coupled to the I/O interface 860. Other devices may be coupled to the processing unit 801, and additional or fewer interface cards may be utilized. For example, a serial interface card (not shown) may be used to provide a serial interface for a printer.

The processing unit 801 also includes one or more network interfaces 850, which may comprise wired links, such as an Ethernet cable or the like, and/or wireless links to access nodes or one or more networks 880. The network interface 850 allows the processing unit 801 to communicate with remote units via the networks 880. For example, the network interface 850 may provide wireless communication via one or more transmitters/transmit antennas and one or more receivers/receive antennas. In an embodiment, the processing unit 801 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for receiving multiple-input and multiple-output (MIMO) transmission and relay channels using device-to-device communications, the method comprising:
   receiving, at a destination terminal from a base-station, a transmit signal for the MIMO transmission, wherein the transmit signal is beam-formed in accordance with a transmit covariance obtained by iteratively optimizing the transmit covariance and a quantization noise covariance for compressing and relaying the transmit signal from a relay terminal to the destination terminal, wherein iteratively optimizing the transmit covariance and the quantization noise covariance is in accordance with known channel state information and with statistics of noise and interference for transmit and relay channels, and wherein iteratively optimizing the transmit covariance and the quantization noise covariance comprises:
      calculating the quantization noise covariance using simultaneous diagonalization by congruence in a closed form solution, while keeping the transmit covariance fixed;
      calculating the transmit covariance while keeping the calculated quantized noise covariance fixed; and
      iteratively repeating the calculating the quantization noise covariance and the calculating the transmit covariance until values of the quantization noise covariance and the transmit covariance converge;
   receiving, at the destination terminal from the relay terminal using the device-to-device communications, a relay signal obtained by compressing the transmit signal for the MIMO transmission, wherein the relay signal is compressed by quantization in accordance with the quantization noise covariance; and
   removing interference in the received transmit signal and the received relay signal in accordance with correlated noise in the received transmit signal and the received relay signal.

2. The method of claim 1, wherein the compressed relay signal is received at a rate determined in accordance with a capacity constraint capacity on a relay link between the relay terminal and the destination terminal.

3. The method of claim 1, wherein the relay signal is compressed in accordance with a Wyner-Ziv coding scheme by accounting for noise correlation in the transmit signal and the relay signal as received by the relay terminal.

4. A method for establishing multiple-input and multiple-output (MIMO) transmission and relay channels using device-to-device communications, the method comprising:
   initializing, at a network controller, a transmit covariance for beam-forming a transmit signal of the MIMO transmission from a base-station to a destination terminal and a relay terminal;
   initializing, at the network controller, a quantization noise covariance used for compressing a relay signal from the relay terminal to the destination terminal, the transmit signal and the relay signal having correlated noise, wherein the transmit covariance and the quantization noise covariance are initialized in accordance with known channel state information and with statistics of noise and interference for transmit and relay channels; and
   iteratively optimizing the transmit covariance and the quantization noise covariance in accordance with a capacity constraint on a relay link between the relay terminal and the destination terminal and a transmit signal power constraint of the base-station, wherein iteratively optimizing the transmit covariance and the quantization noise covariance comprises:
      calculating the quantization noise covariance using simultaneous diagonalization by congruence in a closed form solution, while keeping the transmit covariance fixed;
      calculating the transmit covariance while keeping the calculated quantized noise covariance fixed; and
      iteratively repeating the calculating the quantization noise covariance and the calculating the transmit covariance until values of the quantization noise covariance and the transmit covariance converge.

5. The method of claim 4, wherein iteratively optimizing the transmit covariance and the quantization noise covariance includes maximizing a Lagrangian function of the transmit covariance and the quantization noise covariance by selecting a Lagrangian multiplier value.

6. The method of claim 5, wherein iteratively optimizing the transmit covariance and the quantization noise covariance includes:
   initializing the transmit covariance for the transmit signal with Gaussian noise in accordance with the known channel state information and the statistics of noise and interference for the transmit and relay channels;
   selecting the Lagrangian multiplier value of the Lagrangian function;
   performing the calculating the quantization noise covariance, the calculating the transmit covariance and the iteratively repeating;
   updating the Lagrangian multiplier value using bisection in accordance with the converged values of the quantization noise covariance and transmit covariance; and
   repeating the selecting, the performing and the updating until a rate on the relay link meets the capacity constraint.

7. The method of claim 6, wherein the transmit covariance is calculated using a numerical software package for solving a convex function.

8. The method of claim 4 further comprising beam-forming the transmit signal in accordance with the optimized transmit covariance.

9. The method of claim 4 further comprising:
   sending the transmit covariance to the base-station; and
   sending the quantization noise covariance to the relay terminal.

10. The method of claim 4, wherein the transmit covariance and the quantization noise covariance are established assuming Gaussian statistics and correlated noise at the destination terminal and the relay terminal due to common source interference.

11. The method of claim 4, wherein the network controller is located at the base-station.

12. A destination terminal for receiving multiple-input and multiple-output (MIMO) transmission and relay channels using device-to-device communications, the destination terminal comprising:
  a processor coupled to a memory; and
  a non-transitory computer readable storage medium storing programming for execution by the processor, the programming including instructions to:
    receive, from a base-station, a transmit signal for the MIMO transmission, wherein the transmit signal is beam-formed in accordance with a transmit covariance obtained by iteratively optimizing the transmit covariance and a quantization noise covariance for compressing and relaying the transmit signal from a relay terminal to the destination terminal, wherein iteratively optimizing the transmit covariance and the quantization noise covariance is in accordance with known channel state information and with statistics of noise and interference for transmit and relay channels, and wherein iteratively optimizing the transmit covariance and the quantization noise covariance comprises:
      calculating the quantization noise covariance using simultaneous diagonalization by congruence in a closed form solution, while keeping the transmit covariance fixed;
      calculating the transmit covariance while keeping the calculated quantized noise covariance fixed; and
      iteratively repeating the calculating the quantization noise covariance and the calculating the transmit covariance until values of the quantization noise covariance and the transmit covariance converge;
    receive, from the relay terminal using the device-to-device communications, a relay signal obtained by compressing the transmit signal for the MIMO transmission, wherein the relay signal is compressed by quantization in accordance with the quantization noise covariance; and
    remove interference in the received transmit signal and the received relay signal in accordance with correlated noise in the received transmit signal and the received relay signal.

13. The destination terminal of claim 12, wherein according to the instructions, the compressed relay signal is received at a rate determined in accordance with a capacity constraint capacity on a relay link between the relay terminal and the destination terminal.

14. The destination terminal of claim 12, wherein the relay signal is compressed in accordance with a Wyner-Ziv coding scheme by accounting for noise correlation in the transmit signal and the relay signal as received by the relay terminal.

15. A network controller for establishing multiple-input and multiple-output (MIMO) transmission and relay channels using device-to-device communications, the network controller comprising:
  a processor coupled to a memory; and
  a non-transitory computer readable storage medium storing programming for execution by the processor, the programming including instructions to:
    initialize a transmit covariance for beam-forming a transmit signal of the MIMO transmission from a base-station to a destination terminal and a relay terminal;
    initialize a quantization noise covariance used for compressing a relay signal from the relay terminal to the destination, the transmit signal and the relay signal having correlated noise, wherein the transmit covariance and the quantization noise covariance are initialized in accordance with known channel state information and with statistics of noise and interference for transmit and relay channels; and
    iteratively optimize the transmit covariance and the quantization noise covariance in accordance with a capacity constraint on a relay link between the relay terminal and the destination terminal and a transmit signal power constraint of the base-station, wherein the instructions to iteratively optimize the transmit covariance and the quantization noise covariance include instructions to:
      calculate the quantization noise covariance using simultaneous diagonalization by congruence in a closed form solution, while keeping the transmit covariance fixed;
      calculate the transmit covariance while keeping the calculated quantized noise covariance fixed; and
      iteratively repeat the calculating the quantization noise covariance and the calculating the transmit covariance until values of the quantization noise covariance and the transmit covariance converge.

16. The network controller of claim 15, wherein the instructions to iteratively optimize the transmit covariance and the quantization noise covariance include instructions to:
  initialize the transmit covariance for the transmit signal with Gaussian noise in accordance with the known channel state information and the statistics of noise and interference for the transmit and relay channels;
  select a Lagrangian multiplier value of a Lagrangian function of the transmit covariance and the quantization noise covariance;
  perform the calculating the quantization noise covariance, the calculating the transmit covariance and the iteratively repeating;
  update the Lagrangian multiplier value using bisection in accordance with the converged values of the quantization noise covariance and transmit covariance; and
  repeat the selecting, the performing and the updating until a rate on the relay link meets the capacity constraint.

17. The network controller of claim 16, wherein the instructions include calculating the transmit covariance using a numerical software package for solving a convex function.

18. The network controller of claim 15, wherein the network controller is located at the base-station.

* * * * *